United States Patent
Blose

(10) Patent No.: US 12,544,622 B2
(45) Date of Patent: Feb. 10, 2026

(54) GOLF SWING TRACKING SYSTEM

(71) Applicant: Jonathan Blose, San Diego, CA (US)

(72) Inventor: Jonathan Blose, San Diego, CA (US)

( * ) Notice: Subject to any disclaimer, the term of this patent is extended or adjusted under 35 U.S.C. 154(b) by 0 days.

(21) Appl. No.: 18/484,621

(22) Filed: Oct. 11, 2023

(65) Prior Publication Data

US 2024/0033569 A1 Feb. 1, 2024

Related U.S. Application Data

(63) Continuation of application No. 17/316,158, filed on May 10, 2021, now Pat. No. 11,819,733.

(60) Provisional application No. 63/022,459, filed on May 9, 2020.

(51) Int. Cl.
*A63B 24/00* (2006.01)
*A63B 71/06* (2006.01)
*A63B 102/32* (2015.01)

(52) U.S. Cl.
CPC ...... *A63B 24/0003* (2013.01); *A63B 71/0622* (2013.01); *A63B 2071/0691* (2013.01); *A63B 2102/32* (2015.10); *A63B 2220/05* (2013.01); *A63B 2220/12* (2013.01); *A63B 2220/803* (2013.01); *A63B 2220/806* (2013.01); *A63B 2220/836* (2013.01); *A63B 2225/50* (2013.01)

(58) Field of Classification Search
CPC ............ A63B 24/0003; A63B 71/0622; A63B 2071/0691; A63B 2102/32; A63B 2220/05; A63B 2220/12; A63B 2220/803; A63B 2220/806; A63B 2220/836; A63B 2225/50; A63B 2024/0028; A63B 24/0021; A63B 69/3608

See application file for complete search history.

(56) References Cited

U.S. PATENT DOCUMENTS

| | | | |
|---|---|---|---|
| 8,465,376 B2 | 6/2013 | Bentley | |
| 9,452,338 B1 | 9/2016 | Nickles, Jr. et al. | |
| 9,712,730 B2 * | 7/2017 | Phillips | F16M 11/14 |
| 2012/0052971 A1 * | 3/2012 | Bentley | A63B 24/0006 |
| | | | 473/222 |
| 2014/0270685 A1 * | 9/2014 | Letke | H04N 23/50 |
| | | | 362/106 |
| 2015/0172538 A1 | 6/2015 | Nordstrom et al. | |
| 2015/0343294 A1 * | 12/2015 | Leech | A63B 71/0619 |
| | | | 473/209 |
| 2017/0090851 A1 * | 3/2017 | Takano | G09G 3/003 |
| 2021/0132477 A1 * | 5/2021 | Holland | H04N 5/222 |
| 2022/0312128 A1 * | 9/2022 | Rosenwein | G06V 40/166 |

* cited by examiner

*Primary Examiner* — Jeffrey S Vanderveen
(74) *Attorney, Agent, or Firm* — Boudwin Intellectual Property Law, LLC; Daniel Boudwin

(57) ABSTRACT

A golf swing tracking system includes a wearable device. The wearable device has a camera, a processor and a signal transceiver. The camera is connected to the processor. The processor is in connected to the signal transceiver. The golf swing tracking system further includes an electronic device. The electronic device includes a signal receiver. The signal receiver is designed to receive a collection of data from the signal transceiver of the wearable device. The electronic device has a display and is programmed to execute an application. The application is designed to display the collection of data and to transmit the collection of data to a network, such as a social media network.

13 Claims, 3 Drawing Sheets

GOLF SWING TRACKING SYSTEM

CROSS REFERENCE TO RELATED APPLICATIONS

This application claims the benefit of U.S. Provisional Application No. 63/022,459 filed on May 9, 2020 and to U.S. Nonprovisional application Ser. No. 17/316,158 filed on May 10, 2021. The above identified patent applications are herein incorporated by reference in their entirety to provide continuity of disclosure.

BACKGROUND OF THE INVENTION

The present invention relates to a golf swing tracking device and system. More specifically, the present invention relates to a wearable system, pairable with an electronic device, that is configured to track the path and distance of a golf ball that is struck by the user.

The sport of golf has existed for over five centuries and has grown from an obscure sport of disputed ancient origins to a global phenomenon enjoyed by a variety of peoples across cultures and national boundaries. Generally, the sport of golf consists of one or more players using a golf club to transmit a golf ball into a number of holes using as few attempts, or swings, as possible. As such, golf is a sport of skill, technique, focus, control and athletic prowess.

In the course of a round of golf, a player may wish to record a shot so that he or she may review it personally, or share it with others. However, an individual swinging a golf club will be unable to hold or operate a camera. Furthermore, asking another golfer to record you while you swing could be inconvenient or impossible, such as if an individual is golfing by himself or herself. Therefore, there is a defined need amongst the known prior art references for a system capable of capturing, storing and sharing a golf shot without requiring the use of distractive or ineffective devices.

SUMMARY OF THE INVENTION

In view of the foregoing disadvantages inherent in the known types of golf recording and tracking systems now present in the prior art, the present invention provides a golf swing tracking system wherein the same can be utilized for providing convenience for the user when recording and tracking a golf ball.

The golf swing tracking system comprises a wearable device. The wearable device comprises a camera, a processor and a signal transceiver. The camera is in operable connection with the processor. The processor is in operable connection with the signal transceiver. The golf swing tracking system further comprises an electronic device. The electronic device comprises a signal receiver. The signal receiver is configured to receive a collection of data from the signal transceiver of the wearable device. The electronic device further comprises a display. The electronic device is configured to execute an application. The application is configured to display the collection of data and to transmit the collection of data to a network, such as a social media network.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
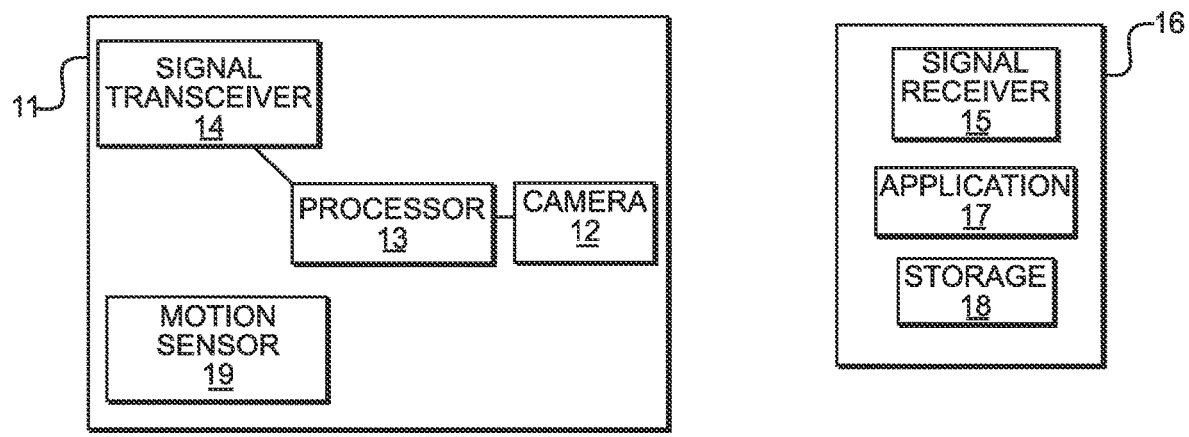
FIG. 1 shows a block diagram of an embodiment of the golf swing system.

Reference is made herein to the attached drawings. Like reference numerals are used throughout the drawings to depict like or similar elements of the golf swing tracking system. The figures are intended for representative purposes only and should not be considered to be limiting in any respect.

Referring now to FIG. 1, there is shown a block diagram of an embodiment of the golf swing system. The golf swing tracking system comprises a wearable device 11. The wearable device 11 is configured to be worn by the user while he or she is playing golf. The wearable device 11 may secure to an article of clothing or to the user's body in some other manner. The wearable device 11 comprises a camera 12. The camera 12 is configured to record visual images from the wearable device 11. The camera 12 is in operable connection with a processor 13. The processor 13 is configured to perform a set of predefined functions. For example, the processor 13 may be configured to record images or video files from the camera 12. The processor 13 is in operable connection with a signal transceiver 14. The signal transceiver 14 is configured to transit a collection of data from the processor 13, such as image, audio and/or video files.

The golf swing tracking system further comprising an electronic device 16. The electronic device 16 comprises a signal receiver 15, such that the electronic device 16 may receive data transmitted from the wearable device 11 via the signal transceiver 14 therein. The electronic device 16 comprises an application 17. The application 17 is configured to format the collection of data for visual review or playback, as well as transmitting the data to a storage unit 18 or a network, such as a social media network. In some embodiments, the wearable device 11 may comprise a storage unit 18.

In one embodiment, the wearable device 11 comprises a motion sensor 19 in operable connection with the camera 12. The motion sensor 19 may be an accelerometer or any other type of sensor configured to sense movement. In such an embodiment, the camera 12 is configured to begin an image capture or video recording when the motion sensor 19 senses that the user has swung the golf club. As such, the camera 12 will not miss the golf shot and will not need to continuously record.

Figure 2:
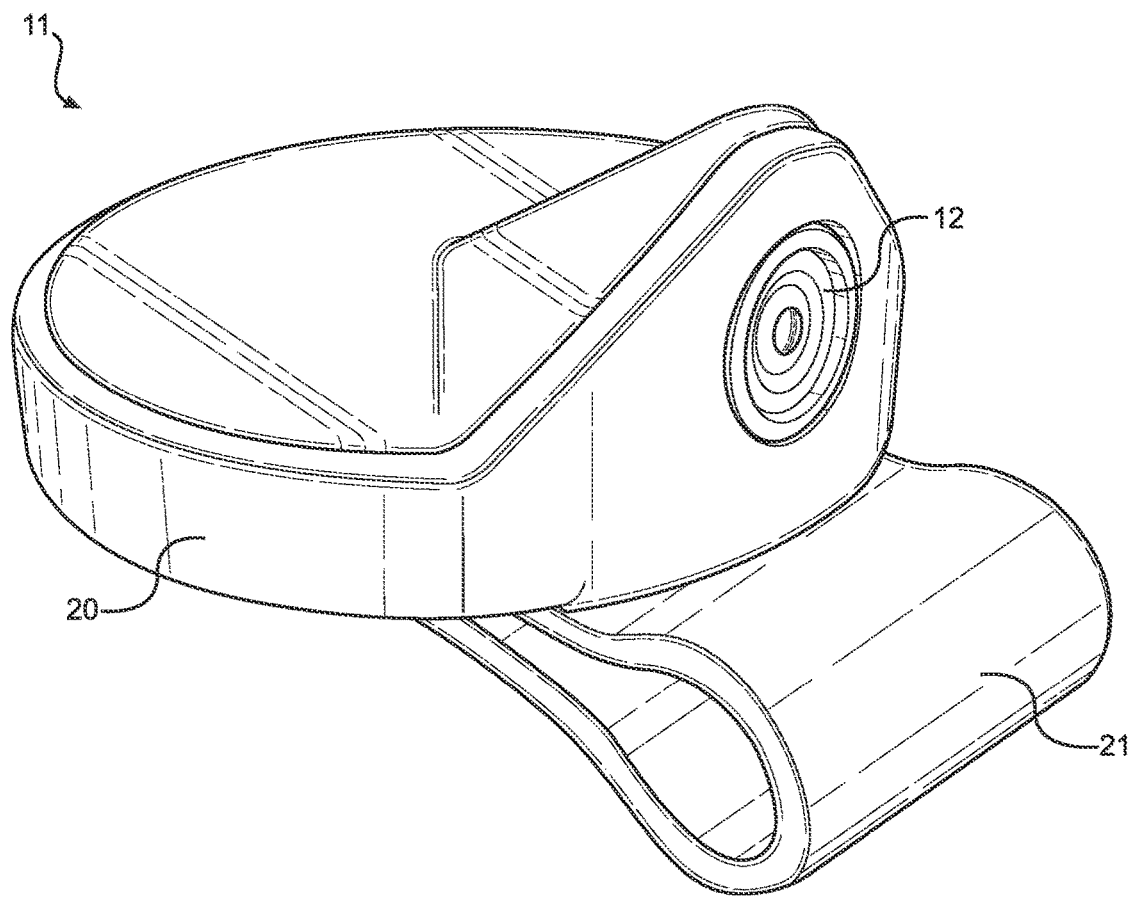
FIG. 2 shows a perspective view of a wearable device of an embodiment of the golf swing tracking system.

Referring now to FIG. 2, there is shown a perspective view of a wearable device of an embodiment of the golf swing tracking system. In the illustrated embodiment, the wearable device 11 comprises a housing 20. The housing 20 comprises a relatively flat profile. Specifically, the housing 20 of the illustrated embodiment is disc-shaped and defines a circular perimeter. As such, the surface area of the housing 20 is increased, displacing the weight of the housing 20 over a greater area. As such, the wearer will be less aware of the weight of the housing 20 when it is secured to him or her.

In the illustrated embodiment, the wearable device 11 comprises a clip 21 disposed on a bottom face of the housing 20. The clip 21 is configured to secure the wearable device 11 to the wearer. In the illustrated embodiment, the clip 21 comprises a loop with a circular protrusion defined on an end opposite the housing 20. As such, the clip 21 may be more easily secured to an article of clothing. Furthermore, in the illustrated embodiment, the housing 20 defines an upward protrusion on which the camera 12 is disposed. The upward protrusion is defined opposite the clip 21 on the housing 20.

Figure 3:
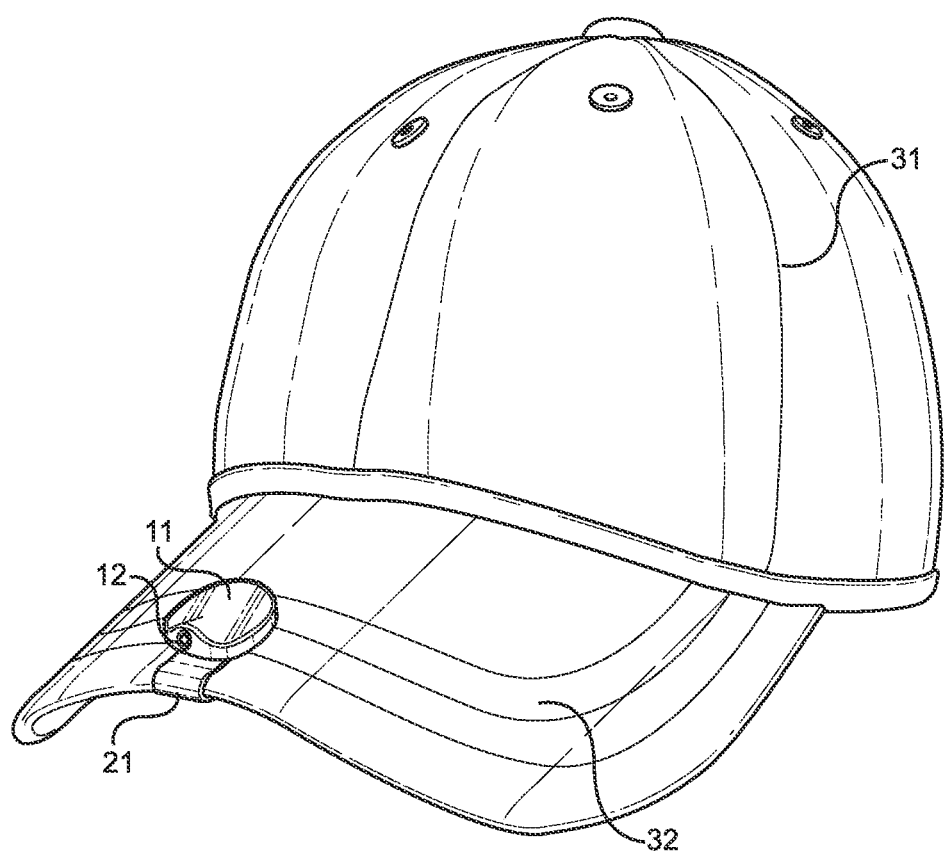
FIG. 3 shows a perspective view of a wearable device of an embodiment of the golf swing tracking system.

Referring now to FIG. 3, there is shown a perspective view of a wearable device of an embodiment of the golf swing tracking system. In the illustrated embodiment, the wearable device 12 is secured to a hat 31. Specifically, the user may place the wearable device 11 on the hat 31 by securing the clip 21 to the brim 32 of the hat 31. As such, the camera 12 will be pointed in the direction of that user's eyes, allowing for the camera 12 to captures images and videos of the golf ball once the user has struck the golf ball. Furthermore, such placement ensures proper capture of the golf shot, as the user will not need to manually manipulate the direction in which the camera 12 is pointed.

Figure 4:
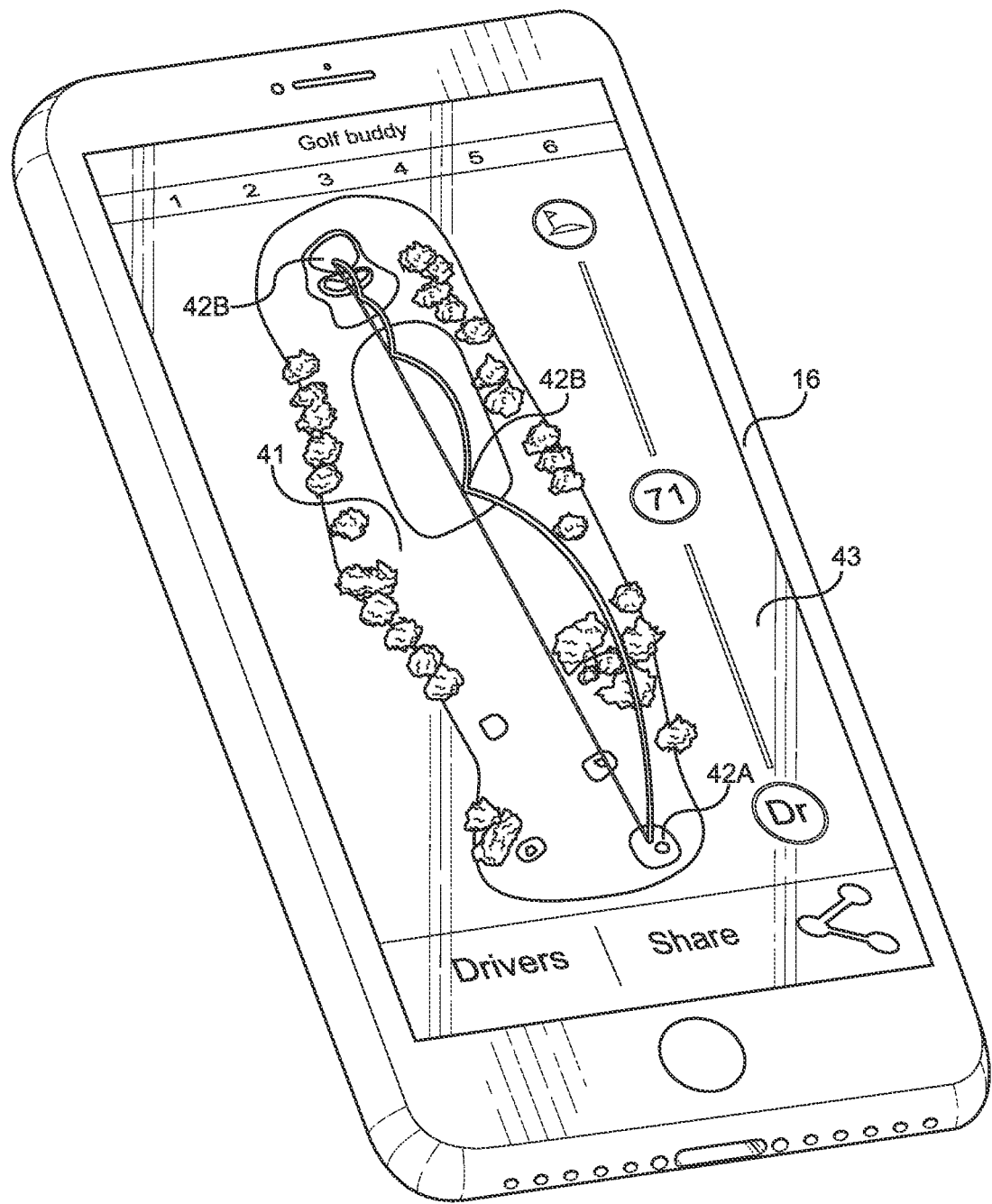
FIG. 4 shows a perspective view of an electronic device of an embodiment of the golf swing tracking system.

Referring now to FIG. 4, there is shown a perspective view of an electronic device of an embodiment of the golf swing tracking system. In the illustrated embodiment, the electronic device 16 is a mobile phone. The electronic device 16 comprises a display 41. The display 41 provides a mechanism for which the user may view the data collected by the camera. In the illustrated embodiment, the display 41 comprises a graphical user interface. The graphical user interface is defined by the application. In the illustrated embodiment, the graphical user interface comprises a map of a golf course. Specifically, the graphical user interface includes a plurality of areas designated as the green of the golf hole 42A, 42B, 42C. The starting point 42A and the hole 42C may be defined. Furthermore, in the illustrated embodiment, the graphical user interface comprises a club indicator 43 such that the user may record the club used for a certain shot, as well as recording the number of strokes that they have taken on a specific hole.

In some embodiments, the electronic device 16 may comprise a global positioning system (GPS) such that the location of the electronic device 16 may be recorded and stored. Alternatively, the wearable device may comprise a global positioning system (GPS) such that the location of the wearable device may be recorded and stored. As such, the user will be able to record the location corresponding to image or video files gathered by the camera.

Furthermore, in the demonstrated embodiment, the application is configured to record the path and distance traveled by the golf ball. Such tracking and recording may be conducted by any known methods. For example, the processor in the wearable device may be configured to identify the speed and angle at which the golf ball is struck to identify the path traveled by the golf ball and to display the path on the graphical user interface of the electronic device 16. In the illustrated embodiment, the path of the golf ball is displayed as an overlay on the map of the golf course on the graphical user interface.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A golf swing tracking system, comprising:
a wearable device;
the wearable device comprising a camera;
the wearable device comprising a processor;
the camera in operable connection with the processor;
the processor in operable connection with a signal transceiver; and
further comprising a clip disposed on the wearable device;
wherein the clip is configured to secure the wearable device to a hat.

2. The golf swing tracking system of claim 1, wherein the wearable device comprises a housing with a relatively flat profile.

3. The golf swing tracking system of claim 1, wherein the wearable device comprises a housing defining a circular perimeter.

4. The golf swing tracking system of claim 1, wherein the wearable device comprises a global positioning system.

5. The golf swing tracking system of claim 1, wherein the camera is a video camera.

6. The golf swing tracking system of claim 1, wherein the wearable device comprises a storage unit.

7. The golf swing tracking system of claim 1, further comprising an electronic device; the electronic device comprising a display; the electronic device comprising a signal receiver; the signal receiver configured to receive a collection of data from the signal transceiver; the electronic device configured to execute an application; and the application configured to transmit the collection of data to a network; wherein the network is a social media network; wherein the processor is configured to track the path and distance of a golf ball after the golf ball is hit; wherein the electronic device comprises a graphical user interface, wherein a graphical user interface comprises a map of a golf course; wherein the graphical user interface records a number of strokes that are taken on a specific hole; and wherein the wearable device further comprises a motion sensor in operable connection with the camera.

8. The golf swing tracking system of claim 7, wherein the electronic device comprises a global positioning system.

9. The golf swing tracking system of claim 7, wherein the electronic device comprises a storage unit.

10. The golf swing tracking system of claim 7, wherein the electronic device comprises a mobile phone that the graphical user interface resides on.

11. The golf swing tracking system of claim 7, wherein the motion sensor in operable connection with the camera is an accelerometer.

12. The golf swing tracking system of claim 11, wherein the camera begins an image capture or a video recording when the accelerometer senses that a user has swung the golf club so the camera will not miss the golf shot and will not need to continuously record.

13. The golf swing tracking system of claim 12, wherein the graphical user interface comprises a club indicator such that the user records the club used for a certain shot.

\* \* \* \* \*